| | | |
|---|---|---|
| (12) | United States Patent<br>Murray et al. | (10) Patent No.: US 10,036,319 B2<br>(45) Date of Patent: Jul. 31, 2018 |

(54) SEPARATOR ASSEMBLY FOR A GAS TURBINE ENGINE

(71) Applicant: General Electric Company, Schenectady, NY (US)

(72) Inventors: Robert Carl Murray, Niskayuna, NY (US); Corey Bourassa, Niskayuna, NY (US); David Vickery Parker, Lynn, MA (US); Byron Andrew Pritchard, Jr., Cincinnati, OH (US); Jonathan Russell Ratzlaff, Cincinnati, OH (US); William Collins Vining, Niskayuna, NY (US); Erich Alois Krammer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 193 days.

(21) Appl. No.: 14/867,379

(22) Filed: Sep. 28, 2015

(65) Prior Publication Data

US 2016/0123227 A1 May 5, 2016

Related U.S. Application Data

(60) Provisional application No. 62/073,514, filed on Oct. 31, 2014.

(51) Int. Cl.
*B01D 50/00* (2006.01)
*F02C 7/052* (2006.01)
(Continued)

(52) U.S. Cl.
CPC .............. *F02C 7/052* (2013.01); *B01D 45/12* (2013.01); *B01D 45/16* (2013.01); *B01D 50/002* (2013.01);
(Continued)

(58) Field of Classification Search
CPC ......... F02C 7/052; B01D 45/16; B01D 45/12; B01D 50/002; B04C 3/00; B04C 3/04; B04C 3/06; B04C 2003/006
See application file for complete search history.

(56) References Cited

U.S. PATENT DOCUMENTS

| 2,806,551 A | 9/1957 | Heinrich |
| 3,064,411 A | 11/1962 | Breslove, Jr. |

(Continued)

FOREIGN PATENT DOCUMENTS

| EP | 0162441 A2 | 11/1985 |
| EP | 0227577 B1 | 1/1992 |

(Continued)

OTHER PUBLICATIONS

PCT Search Report and Written Opinion issued in connection with related PCT Application No. PCT/US2015/033108 dated Jul. 12, 2016.

(Continued)

*Primary Examiner* — Dung H Bui
(74) *Attorney, Agent, or Firm* — General Electric Company; William Andes

(57) ABSTRACT

A separator assembly for removing entrained particles from a fluid stream passing through a gas turbine engine includes a first particle separator for separating the fluid stream into a reduced-particle stream and a particle-laden stream, and emitting the particle-laden stream through a scavenge outlet. Another particle remover is fluidly coupled to the scavenge outlet to remove more particles from the air stream.

40 Claims, 12 Drawing Sheets

(51) Int. Cl.
  *B01D 45/12* (2006.01)
  *B01D 45/16* (2006.01)
  *B04C 3/04* (2006.01)
  *B04C 3/06* (2006.01)
  *B04C 3/00* (2006.01)

(52) U.S. Cl.
  CPC .................................... *B04C 3/00* (2013.01);
    *B04C 3/04* (2013.01); *B04C 3/06* (2013.01);
    *B04C 2003/006* (2013.01)

(56) References Cited

U.S. PATENT DOCUMENTS

| | | | |
|---|---|---|---|
| 3,274,757 A | 9/1966 | Wapler | |
| 3,302,396 A | 2/1967 | Robbins | |
| 3,309,867 A | 3/1967 | Ehrich | |
| 3,421,299 A | 1/1969 | Poplawski | |
| 3,993,463 A | 11/1976 | Barr | |
| 4,378,234 A | 3/1983 | Suzuki et al. | |
| 4,527,387 A | 7/1985 | Lastrina et al. | |
| 4,650,578 A | 3/1987 | Cerdan et al. | |
| 4,685,942 A | 8/1987 | Klassen et al. | |
| 4,820,122 A | 4/1989 | Hall et al. | |
| 4,820,123 A | 4/1989 | Hall | |
| 4,992,025 A | 2/1991 | Stroud et al. | |
| 5,062,768 A | 11/1991 | Marriage | |
| 5,135,354 A | 8/1992 | Novotny | |
| 5,193,975 A | 3/1993 | Bird et al. | |
| 5,279,109 A | 1/1994 | Liu et al. | |
| 5,348,571 A | 9/1994 | Weber | |
| 5,498,273 A | 3/1996 | Mann | |
| 5,538,394 A | 7/1996 | Inomata et al. | |
| 5,558,496 A | 9/1996 | Woodmansee et al. | |
| 5,700,131 A | 12/1997 | Hall et al. | |
| 5,788,741 A | 8/1998 | Burton et al. | |
| 5,827,043 A | 10/1998 | Fukuda et al. | |
| 5,857,833 A | 1/1999 | Dev | |
| 5,918,458 A | 7/1999 | Coffinberry et al. | |
| 5,951,250 A | 9/1999 | Suenaga et al. | |
| 6,033,181 A | 3/2000 | Endres et al. | |
| 6,039,537 A | 3/2000 | Scheurlen | |
| 6,151,881 A | 11/2000 | Ai et al. | |
| 6,164,913 A | 12/2000 | Reddy | |
| 6,238,183 B1 | 5/2001 | Williamson et al. | |
| 6,238,459 B1 | 5/2001 | Downs | |
| 6,261,053 B1 | 7/2001 | Anderson et al. | |
| 6,264,428 B1 | 7/2001 | Dailey et al. | |
| 6,277,278 B1 | 8/2001 | Conrad et al. | |
| 6,318,960 B1 | 11/2001 | Kuwabara et al. | |
| 6,318,963 B1 | 11/2001 | Emery et al. | |
| 6,368,060 B1 | 4/2002 | Fehrenbach et al. | |
| 6,382,906 B1 | 5/2002 | Brassfield et al. | |
| 6,413,044 B1 | 7/2002 | Roeloffs et al. | |
| 6,517,612 B1* | 2/2003 | Crouch | B01D 33/067 55/304 |
| 6,527,829 B1 | 3/2003 | Malkamaeki et al. | |
| 6,620,217 B2* | 9/2003 | Bruckmann | B01D 45/12 210/512.1 |
| 6,673,133 B2 | 1/2004 | Sechrist et al. | |
| 6,698,180 B2 | 3/2004 | Snyder | |
| 6,797,026 B2 | 9/2004 | Sechrist et al. | |
| 6,840,737 B2 | 1/2005 | Flatman | |
| 6,875,256 B2 | 4/2005 | Gillingham et al. | |
| 6,910,370 B2 | 6/2005 | Clark et al. | |
| 6,969,237 B2 | 11/2005 | Hudson | |
| 7,048,501 B2 | 5/2006 | Katayama et al. | |
| 7,052,532 B1 | 5/2006 | Liu et al. | |
| 7,080,972 B2 | 7/2006 | Rawlinson | |
| 7,097,419 B2 | 8/2006 | Lee et al. | |
| 7,128,533 B2 | 10/2006 | Liang | |
| 7,137,777 B2 | 11/2006 | Fried et al. | |
| 7,244,101 B2 | 7/2007 | Lee et al. | |
| 7,282,074 B1* | 10/2007 | Witter | B01D 45/12 451/453 |
| 7,284,953 B2 | 10/2007 | Silverman et al. | |
| 7,540,712 B1 | 6/2009 | Liang | |
| 7,563,073 B1 | 7/2009 | Liang | |
| 7,572,102 B1 | 8/2009 | Liang | |
| 7,581,397 B2 | 9/2009 | Strangman et al. | |
| 7,582,145 B2 | 9/2009 | Krigmont | |
| 7,645,122 B1 | 1/2010 | Liang | |
| 7,665,965 B1 | 2/2010 | Liang | |
| 7,770,375 B2 | 8/2010 | Alvanos et al. | |
| 7,874,158 B2 | 1/2011 | O'Neill et al. | |
| 7,879,123 B2 | 2/2011 | Lundquist et al. | |
| 7,921,654 B1 | 4/2011 | Liang | |
| 7,922,784 B2 | 4/2011 | Saeed et al. | |
| 7,934,906 B2 | 5/2011 | Gu et al. | |
| 7,955,053 B1 | 6/2011 | Liang | |
| 7,967,554 B2 | 6/2011 | Bremer | |
| 7,976,277 B2 | 7/2011 | Kopmels et al. | |
| 8,092,145 B2 | 1/2012 | Martel et al. | |
| 8,104,362 B2 | 1/2012 | McFarland et al. | |
| 8,142,153 B1 | 3/2012 | Liang | |
| 8,142,545 B2* | 3/2012 | Strauser | B01D 45/16 55/344 |
| 8,176,720 B2 | 5/2012 | Beeck | |
| 8,240,121 B2 | 8/2012 | Hazzard et al. | |
| 8,348,614 B2 | 1/2013 | Piggush et al. | |
| 8,561,411 B2 | 10/2013 | Dibenedetto | |
| 8,573,034 B2 | 11/2013 | Grant et al. | |
| 8,626,467 B2 | 1/2014 | Fang | |
| 8,672,629 B2 | 3/2014 | Botrel et al. | |
| 8,733,185 B2 | 5/2014 | Solomon | |
| 8,746,464 B2 | 6/2014 | Maier | |
| 2002/0166200 A1 | 11/2002 | Conrad et al. | |
| 2002/0182062 A1 | 12/2002 | Scimone | |
| 2004/0197191 A1 | 10/2004 | Cunha et al. | |
| 2004/0221720 A1 | 11/2004 | Anderson et al. | |
| 2005/0118024 A1 | 6/2005 | Anguisola McFeat et al. | |
| 2005/0129508 A1 | 6/2005 | Fried et al. | |
| 2005/0138763 A1* | 6/2005 | Tanner | A47L 9/165 15/353 |
| 2005/0214118 A1 | 9/2005 | Dodd | |
| 2006/0073015 A1 | 4/2006 | Liang | |
| 2006/0133923 A1 | 6/2006 | Paauwe et al. | |
| 2006/0275118 A1 | 12/2006 | Lee | |
| 2007/0048122 A1 | 3/2007 | Van Suetendael, IV et al. | |
| 2007/0140848 A1 | 6/2007 | Charbonneau et al. | |
| 2007/0175185 A1* | 8/2007 | Kim | B01D 45/14 55/337 |
| 2008/0041064 A1 | 2/2008 | Moore et al. | |
| 2009/0060715 A1 | 3/2009 | Kopmels | |
| 2009/0081024 A1 | 3/2009 | Tibbott | |
| 2009/0126337 A1 | 5/2009 | Hazzard et al. | |
| 2009/0155088 A1 | 6/2009 | Lee et al. | |
| 2009/0202337 A1 | 8/2009 | Bosley et al. | |
| 2009/0214329 A1 | 8/2009 | Joe et al. | |
| 2009/0255230 A1 | 10/2009 | Mildner | |
| 2009/0261208 A1 | 10/2009 | Belyew | |
| 2010/0021308 A1 | 1/2010 | Rawlinson | |
| 2010/0024370 A1 | 2/2010 | Jones et al. | |
| 2010/0040480 A1 | 2/2010 | Webster et al. | |
| 2010/0119377 A1 | 5/2010 | Tibbott et al. | |
| 2010/0162682 A1 | 7/2010 | Lerg | |
| 2010/0172762 A1 | 7/2010 | Rawlinson | |
| 2010/0239409 A1 | 9/2010 | Draper | |
| 2010/0247321 A1 | 9/2010 | Kulkarni et al. | |
| 2010/0254801 A1 | 10/2010 | Tibbott | |
| 2011/0016838 A1 | 1/2011 | Smithies et al. | |
| 2011/0067378 A1 | 3/2011 | Tibbott et al. | |
| 2011/0236188 A1 | 9/2011 | Knapp et al. | |
| 2011/0247345 A1 | 10/2011 | Laurello et al. | |
| 2011/0247347 A1 | 10/2011 | Ebert et al. | |
| 2012/0070308 A1 | 3/2012 | Naik et al. | |
| 2012/0207594 A1 | 8/2012 | Chanez et al. | |
| 2012/0233973 A1 | 9/2012 | Sedillo | |
| 2012/0297742 A1* | 11/2012 | Betting | B01D 45/16 55/434.2 |
| 2013/0223987 A1 | 8/2013 | Stafford et al. | |
| 2014/0083116 A1 | 3/2014 | Crites et al. | |

(56) References Cited

U.S. PATENT DOCUMENTS

2014/0196437 A1  7/2014  Schneider
2014/0290254 A1  10/2014 Manning et al.

FOREIGN PATENT DOCUMENTS

| | | |
|---|---|---|
| EP | 0340149 B1 | 5/1993 |
| EP | 0924408 A3 | 5/2001 |
| EP | 0690202 B1 | 8/2001 |
| EP | 1267037 B1 | 7/2006 |
| EP | 2549078 A1 | 1/2013 |
| EP | 2405985 B1 | 8/2013 |
| EP | 2927428 A1 | 10/2015 |
| GB | 711304 A | 6/1954 |
| GB | 1070458 A | 6/1967 |
| GB | 1146262 A | 3/1969 |
| GB | 1412780 A | 11/1975 |
| GB | 2270481 A | 3/1994 |
| WO | 2011006262 A1 | 1/2011 |
| WO | 2011115880 A1 | 9/2011 |

OTHER PUBLICATIONS

Poplawski et al., "Microscopic Particle Separation and Applications", Aerospace Research Laboratories, 20 Years of Research Progress, Accession No. AD0667557, Project No. 7116, pp. 1-67, Feb. 1968.
Walsh et al., "Effects of Sand Ingestion on the Blockage of Film-Cooling Holes", Proceedings of GT2006, ASME Turbo Expo 2006: Power for Land, Sea and Air, Barcelona, Spain, vol. No. 3, pp. 81-90, May 8-11, 2006.
Musgrove et al., "Computational Design of a Louver Particle Separator for Gas Turbine Engines", Proceedings of ASME Turbo Expo 2009: Power for Land, Sea and Air, GT2009, Orlando, Florida, USA, vol. No. 3, pp. 1313-1323, Jun. 8-12, 2009.
Cardwell et al., "Investigation of Sand Blocking Within Impingement and Film-Cooling Holes", Journal of Turbomachinery, Transactions of the ASME, vol. No. 132, Issue No. 2, pp. 021020-1-021020-10, Apr. 2010.
Filippone et al., "Turboshaft Engine Air Particle Separation", Progress in Aerospace Sciences, vol. No. 46, Issue No. 5-6, pp. 224-245, Jul.-Aug. 2010.
Lawson et al., "Simulations of Multiphase Particle Deposition on Endwall Film-Cooling Holes in Transverse Trenches", Journal of Turbomachinery, Transactions of the ASME, vol. No. 134, pp. 051040-1-051040-10, Sep. 2012.
Lawson et al., "Simulations of Multiphase Particle Deposition on a Showerhead With Staggered Film-Cooling Holes", Journal of Turbomachinery, Transactions of the ASME, vol. No. 134, pp. 051041-1-051041-12, Sep. 2012.
European Search Report and Opinion issued in connection with corresponding EP Application No. 15169688.7 dated Oct. 27, 2015.
Sennett, "Air Filtration: Perfect Air Filtering for Gas Turbines." Filtration & Separation, vol. 44, Issue. 10, pp. 20-22, Dec. 2007.
PCT Search Report and Written Opinion issued in connection with related PCT Application No. PCT/US2015/033180 dated Mar. 1, 2016.
PCT Search Report and Written Opinion issued in connection with related PCT Application No. PCT/US2015/032855 dated Mar. 14, 2016.
European Search Report and Opinion issued in connection with related EP Application No. EP15191609 dated Mar. 16, 2016.
European Search Report and Opinion issued in connection with corresponding EP Application No. 15190287.1 dated Mar. 4, 2016.
European Search Report and Opinion issued connection with Related EP Application No. 16193374.2 dated Feb. 16, 2017.
U.S. Non-Final Office Action issued in connection with Related U.S. Appl. No. 14/715,700 dated Apr. 5, 2017.

* cited by examiner

SEPARATOR ASSEMBLY FOR A GAS TURBINE ENGINE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, may be necessary. Typically, cooling is accomplished by ducting cooler air from the high and/or low pressure compressors to the engine components which require cooling. Temperatures in the high pressure turbine are around 1000° C. to 2000° C. and the cooling air from the compressor is around 500° C. to 700° C. While the compressor air is a high temperature, it is cooler relative to the turbine air, and may be used to cool the turbine.

Particles, such as dirt, dust, sand, and other environmental contaminants, in the cooling air can cause a loss of cooling and reduced operational time or "time-on-wing" for the aircraft environment. For example, particles supplied to the turbine components can reduce the cooling effectiveness, which can reduce the lifespan of the components. This problem is exacerbated in certain operating environments around the globe where turbine engines are exposed to significant amounts of airborne particles.

In geographic regions of the world that are in proximity to desert environments, this airborne particulate is often fine grain sand. Fine sand particulate is easily ingested into the engine core through the gas turbine inlet, and is subsequently carried into the cooling system. Once in the cooling system, fine sand particulate has a propensity to deposit on high temperature surfaces, such as those found in the turbine guide vanes and turbine blades aft of the combustor, and will accumulate over time, which leads to a loss of cooling effectiveness that increases component metal temperatures and thus can negatively impact the durability of the engine component.

BRIEF DESCRIPTION OF THE INVENTION

The invention relates to a separator assembly for removing entrained particles from a fluid stream passing through a gas turbine engine. The separator assembly includes a first particle separator for separating the fluid stream into a reduced-particle stream and a particle-laden stream and a particle remover.

In one aspect, the first particle separator has an inlet receiving the fluid stream, a reduced-particle outlet emitting the reduced-particle stream, and a scavenge outlet emitting the particle-laden stream, and the particle remover is fluidly coupled to the scavenge outlet and has a return outlet emitting a second reduced-particle stream from the particle-laden stream. The return outlet is fluidly coupled to the first particle separator to return the second reduced-particle stream to the first particle separator.

In another aspect, the first particle separator has a body having a peripheral wall defining a flow passage through which the fluid stream flows, a centerbody within the peripheral wall, an inlet receiving the fluid stream, a reduced-particle outlet emitting the reduced-particle stream, and a scavenge outlet emitting the particle-laden stream. The particle remover is located within the centerbody and fluidly coupled to the scavenge outlet, and has a return outlet emitting a second reduced-particle stream from the particle-laden stream. The return outlet is fluidly coupled to the flow passage to return the second reduced-particle stream to the flow passage.

DESCRIPTION OF EMBODIMENTS OF THE INVENTION

Figure 1:
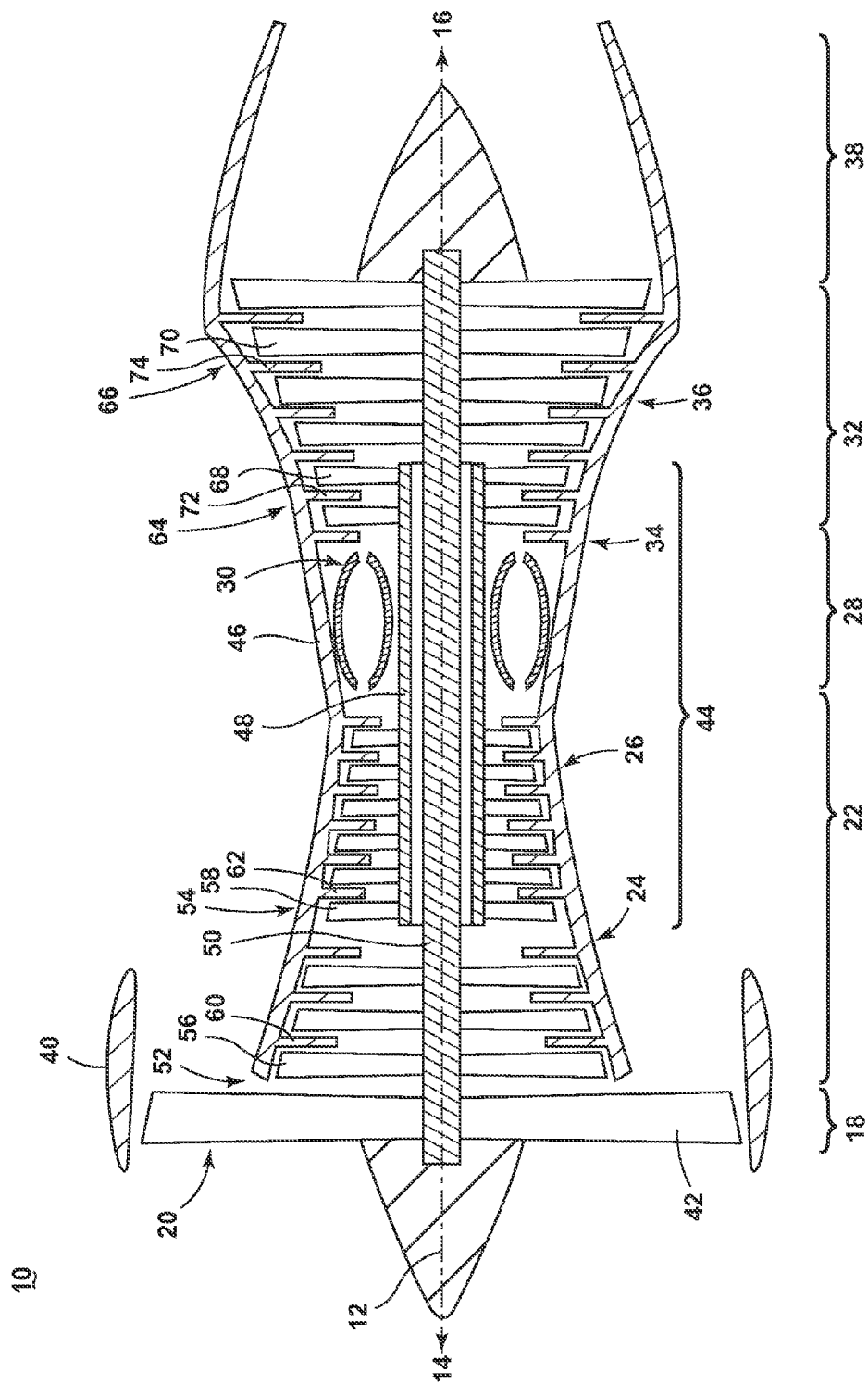
FIG. 1 is a schematic cross-sectional diagram of a gas turbine engine for an aircraft.

The described embodiments of the present invention are directed to systems, methods, and other devices related to particle separation, particularly in a turbine engine, and more particularly to particle separation for the removal of particles from a cooling air flow in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. This air is often referred to as bypass air, which is one form of a cooling fluid when used to cool. In the context of a turbine engine, the hot portions of the engine are normally downstream of the combustor 30, especially the turbine section 32, with the HP turbine 34 being the hottest portion as it is directly downstream of the combustion section 28. Other portions of the aircraft, not part of the engine, may be considered a hot portion that is to be cooled.

Figure 2:
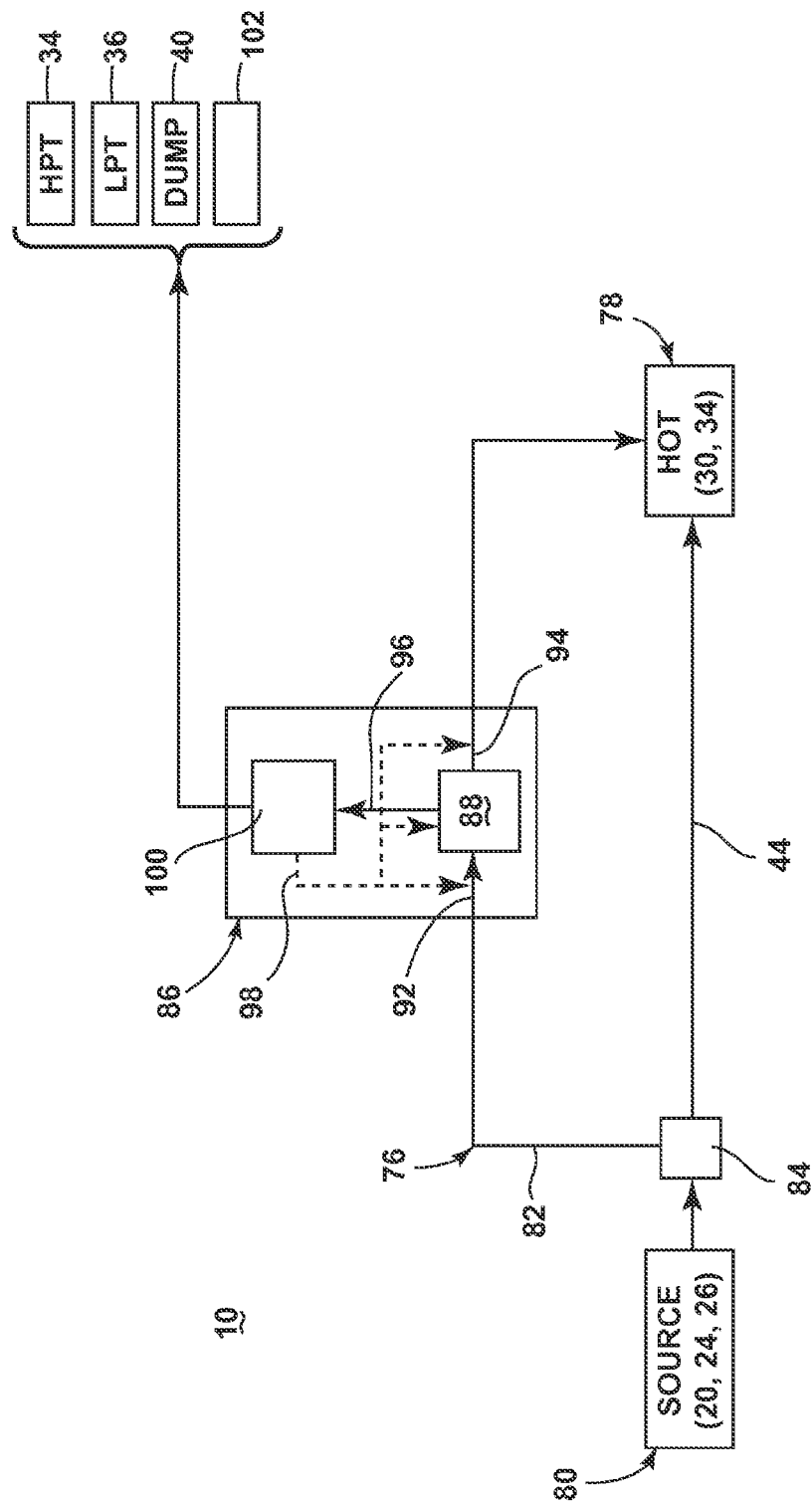
FIG. 2 is a schematic view showing a bypass cooling circuit for the engine of FIG. 1 having a separator assembly.

FIG. 2 is a schematic view showing a portion of the engine 10 from FIG. 1. The engine 10 can further include a cooling circuit 76 for providing cooling fluid to at least one hot portion 78 of the engine 10 during operation. In order to cool the hot portion 78 of the engine, the cooling fluid is at a temperature that is less than the operational temperature of the hot portion 78; i.e. the temperature of the hot portion 78 during normal operation of the engine 10. As indicated in FIG. 2, the hot portion 78 of the engine 10 may include, but is not limited to, the HP turbine 34 and the walls of the combustor 30. A source of cooling fluid 80 entering the cooling circuit 76 may be, but is not limited to, fluid discharged from the fan 20, the LP compressor 24, or the HP compressor 26.

The cooling circuit 76 includes a conduit 82 which bypasses at least a portion of the core 44 of the engine 10 in order to provide cooling fluid to the hot portion 78 of the engine 10. Air may enter the conduit 82 from the source of cooling fluid 80, and may exit the conduit 82 at the hot portion 78 of the engine 10 to which the cooling fluid is to be supplied.

In one configuration, the cooling circuit 76 can include a flow divider 84 which separates the fluid stream from the source of cooling fluid 80 into a core fluid stream which enters the core 44 and a bypass fluid stream which enters the conduit 82. In one configuration, the flow divider 84 can be located between fan blades 42 and the LP compressor 24 (FIG. 1), with the core fluid stream entering the LP compressor 24 and the surrounding bypass fluid stream entering the conduit 82. However, the location of the flow divider 84 can vary depending on the source of cooling fluid 80.

The cooling circuit 76 may include a separator assembly 86 having a first particle separator 88 for separating particles, which may include, but is not limited to, dirt, dust, debris, and other contaminants, from the cooling fluid stream from the source prior to being supplied to the hot portion of the engine 10, and a particle remover 90 for further separating and/or collecting at least some of the particles from the particle-laden stream. The separator assembly 86 may define a portion of the conduit 82, and may be located anywhere along the conduit 82.

The first particle separator 88 may, for example, be an inertial separator which separates particles from the cooling air flow using a combination of forces, such as centrifugal, gravitational, and inertial. More specifically, the inertial separator may be a centrifugal or cyclonic separator, which uses cyclonic action to separate particles from the cooling air flow. Some examples of particle separators are disclosed in U.S. Provisional Application No. 62/004,736, filed May 29, 2013, which is incorporated herein by reference in its entirety.

The particle separator 88 includes a separator inlet 92, a separator outlet 94, and a scavenge outlet 96. The cooling fluid stream entering the particle separator 88 at the separator inlet 92 is separated into a particle-laden stream which contains at least some of the particles from the cooling fluid stream, and a reduced-particle stream which contains fewer or a lower concentration of particles than the particle-laden stream. For example, the particle-laden stream can contain 50%-99% of the particles that were present in the cooling fluid stream entering the particle separator 88. The reduced-particle stream exits the particle separator 88 via the separator outlet 94, and is provided to the hot portion 78 of the engine 10 for cooling.

The scavenge outlet 96 is coupled with the particle remover 90 to further separate and/or collect at least some of the particles from the particle-laden stream that exits the particle separator 88. The particle remover 90 includes a return outlet 98 that emits a second reduced-particle stream. The return outlet 98 is fluidly coupled with the particle separator 88 to return the second reduced-particle stream to the first particle separator 88. The return outlet 98 can be coupled with various portions of the particle separator 88 in order to rejoin the second reduced-particle stream with air flow in the particle separator 88 at different locations. For example, the return outlet 98 can be coupled with the inlet 92 of the particle separator 88 to rejoin the second reduced-particle stream with the incoming cooling fluid stream. Alternatively, the return outlet 98 can be coupled downstream of the inlet 92, such as at the outlet 94 to rejoin the second reduced-particle stream with the first reduced-particle stream.

Examples of the particle remover 90 include a filter which collects particles from the particle-laden stream, a second particle separator which separates particles from the particle-laden stream, or an electrostatic separator which uses a low energy charge beam to separate particles from the particle-laden stream by mass. In the case of a second particle separator, the particle remover 90 may further include a second scavenge outlet 100 emitting a second particle-laden stream. The second particle-laden stream may be exhausted from the engine 10 or may be utilized in other portions of the engine 10. For example, the second particle-laden stream may be used for cooling the HP turbine after passing through an additional particle remover, driving the LP turbine 36, dumped from the engine 10 under the fan casing 40, or supplied to a combustor bleed 102 after passing through an additional particle remover.

In one example, 80-95% of the cooling fluid stream entering the particle separator 88 at the separator inlet 92 can be exhausted through the separator outlet 94 to the hot portion 78 of the engine 10 for cooling, while 5-20% of the incoming cooling fluid stream may be provided to the particle remover 90. For a particle remover 90 comprising a filter, the entire 5-20% of the cooling fluid stream may be returned to the particle separator 88. For a particle remover 90 comprising a second particle separator, 1-2% of the cooling fluid stream may be exhausted through the second scavenge outlet 100.

FIGS. 3-12 show various embodiments of separator assemblies which may be incorporated into the engine 10 shown in FIG. 1 or the cooling circuit 76 shown in FIG. 2. It is understood that the engine 10 or cooling circuit 76 may incorporate more than one of the following separator assemblies. Furthermore, the engine 10 or bypass cooling circuit 76 may incorporate a combination of the following separator assemblies.

Figure 3:
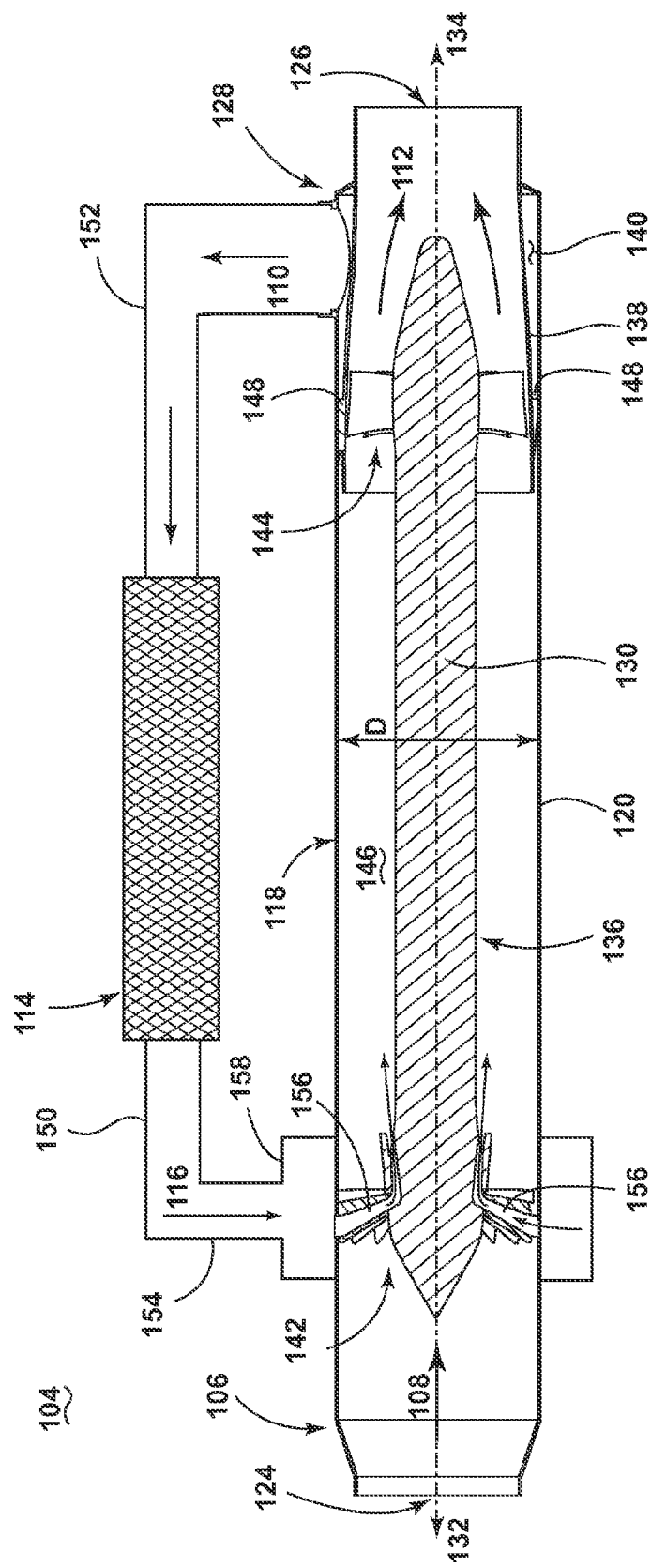
FIG. 3 is a schematic sectional view of a separator assembly according to a first embodiment of the invention.

FIG. 3 is a schematic sectional view of a separator assembly 104 according to a first embodiment of the invention. The separator assembly 104 includes a first particle separator in the form of an inertial separator 106 for separating particles from an incoming cooling fluid stream 108 into a particle-laden stream 110 which contains at least some of the particles from the cooling fluid stream, and a reduced-particle stream 112 which contains fewer or a lower concentration of particles than the particle-laden stream 110, and a particle remover in the form of a filter 114 for further collecting at least some of the particles from the particle-laden stream 110. A second reduced-particle stream 116 is emitted from the filter 114 and returned to the inertial separator 106.

The inertial separator 106 includes a body 118 having a peripheral wall 120 defining a flow passage, with a separator inlet 124 which receives the cooling fluid stream 108, a separator outlet 126 through which the reduced-particle stream 112 is passed, and a scavenge outlet 128 through which the particle-laden stream 110 is passed.

The body 118 defines a centerline 130 of the inertial separator 106, with the centerline 130 generally defining an upstream direction 132 and downstream direction 134 with respect to the inertial separator 106. The inertial separator 106 shown in FIG. 3 is an axial-flow centrifugal separator, with the separator inlet 124 and separator outlet 126 co-axially aligned and lying along the centerline 130. In other configurations, the centerline 130 can follow a curve or bend such that the separator inlet 124 and separator outlet 126 are not co-axially aligned.

In this embodiment, the peripheral wall 120 is provided as an outer, annular wall. A centerbody 136 can be spaced from the peripheral wall 120, and can extend co-axially along the centerline 130. The centerbody 136 may be straight, as shown, curved, or bent. The centerbody 136 can be designed to provide an aerodynamic profile for the flowing air to pass smoothly around the centerbody 136 without separating from the surface of the centerbody 136.

A scavenge annulus 138 is spaced radially inwardly from the peripheral wall 120, which defines, at least in part, the scavenge outlet 128. The scavenge outlet 128 can be formed as an annular passage 140 between the outer surface of the scavenge annulus 138 and the inner surface of the peripheral wall 120.

In one example, the scavenge annulus can be located a distance 2D-10D downstream of the swirl vanes, where D is the diameter of the body 118. The scavenge annulus can further have a length of 0.25D-2D. The scavenge annulus can further be spaced from the peripheral wall 120 a distance of approximately 0.05D to 0.2D.

A plurality of swirl vanes 142 can be located within the body 118, and impart a tangential velocity to the cooling fluid stream 108, thereby providing the cooling fluid stream 108 with a swirling motion downstream of the swirl vanes 142. The swirl vanes 142 of the illustrated embodiment are fixed to the centerbody 136 and are provided as a circumferential array of airfoils extending radially from the centerbody 136 toward the peripheral wall 120. The number of airfoils may vary; in one example, 6-20 airfoils may be provided.

A plurality of deswirl vanes 144 can also be located within the body 118, downstream of the swirl vanes 142, and remove the tangential velocity from the reduced-particle stream 112 and turn the flow vector of the reduced-particle stream 112 from predominantly swirling to predominantly axial before it exits the inertial separator 106 and recovers the total pressure. The deswirl vanes 144 can be provided within the scavenge annulus 138. The deswirl vanes of the illustrated embodiment are provided as a circumferential array of airfoils extending radially from the centerbody 136 toward the scavenge annulus 138. The number of airfoils may vary; in one example, 6-20 airfoils may be provided.

A development region 146 is defined between centerbody 136 and the peripheral wall 120, and between the swirl and deswirl vanes 142, 144. In the development region 146, the cooling fluid stream 108 is separated into the particle-laden stream 110 and the reduced-particle stream 112 by the migration of particles radially outwardly due to the centrifugal force applied by the swirling air. As a result, particles accumulate toward the outer radius of the development region 146, creating the particle-laden stream 110 near the outer radius and the reduced-particle stream 112 near the inner radius. Since the particle-laden stream 110 is radially outward of the reduced-particle stream 112, the particle-laden stream 110 passes from the development region 146 to the scavenge outlet 128 via the annular passage 140 at the exterior of the scavenge annulus 138, while the reduced-particle stream 112 passes from the development region 146 to the separator outlet 126 through the interior of the scavenge annulus 138.

Within the scavenge annulus 138, additional deswirl vanes 148 can be provided in order to remove the tangential velocity from the particle-laden stream 110 and turn the flow vector of the particle-laden stream 110 from predominantly swirling to predominantly axial. The deswirl vanes 148 of the illustrated embodiment are provided as a circumferential array of airfoils extending radially from the scavenge annulus 138 toward the peripheral wall 120. The number of airfoils may vary; in one example, 6-20 airfoils may be provided.

While not shown, the scavenge outlet 128 can further include a volute at the end of the scavenge annulus 138 to turn the particle-laden stream 110 from substantially axial in flow direction to substantially normal to the centerline 130 of the inertial separator 106 so that the particle-laden stream 110 can be extracted from the inertial separator 106.

The filter 114 includes a return outlet 150 that emits the second reduced-particle stream 116. The return outlet 150 is fluidly coupled with the inertial separator 106 to return the second reduced-particle stream to the inertial separator 106. The filter 114 can be coupled with the scavenge outlet 128 via at least one conduit. In the illustrated embodiment, a first conduit 152 extends from the scavenge outlet 128 to the filter 114, and a second conduit 154 extends from the filter 114 to the inertial separator 106 and can define at least a portion of the return outlet 150.

At least one of the swirl vanes 142 defines a return passage 156 fluidly coupled with the return outlet 150. The second conduit 154 can include a plenum 158 located axially of the swirl vanes 142 and in fluid communication with the return outlet 150 and the return passage 156.

Figure 4:
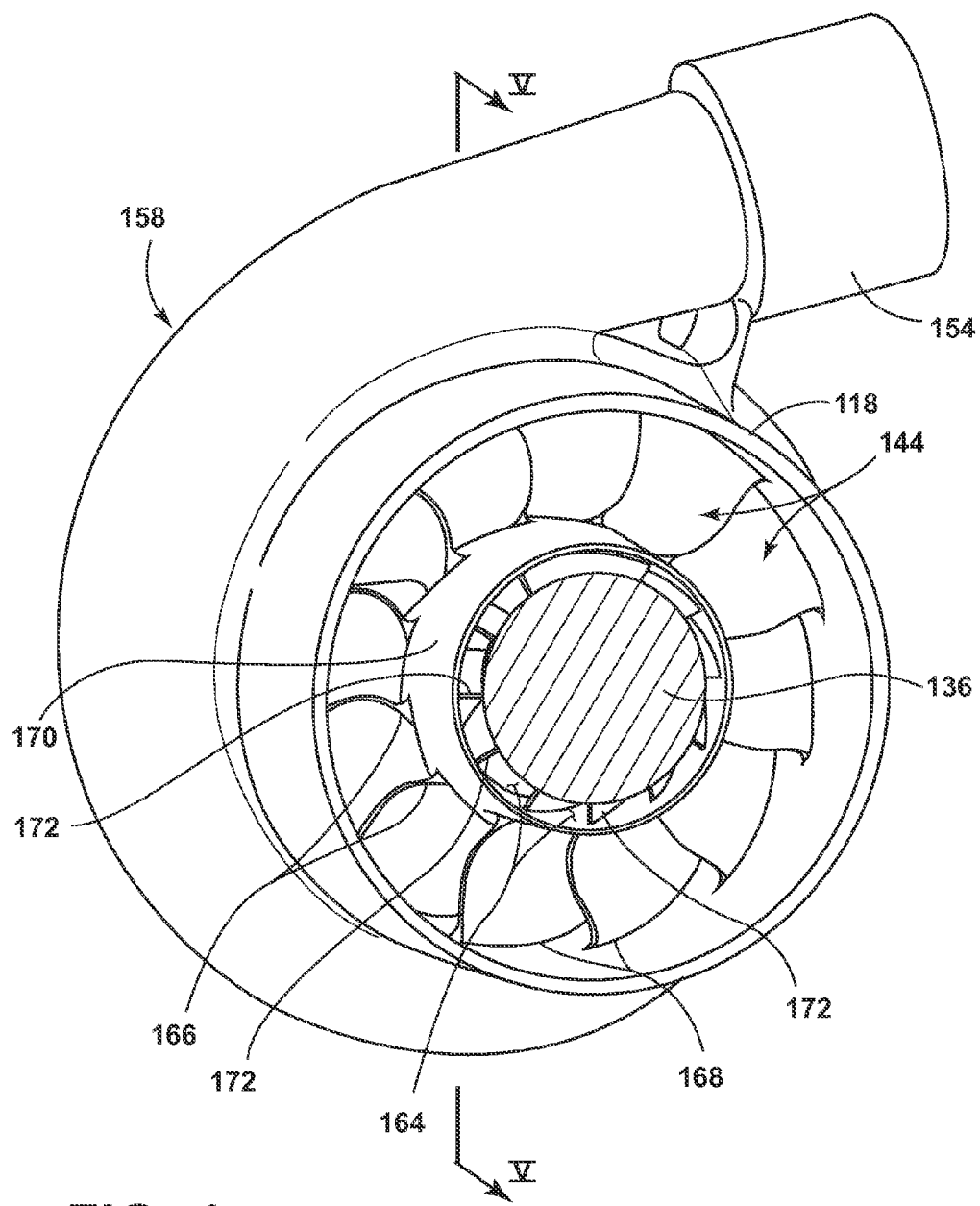
FIG. 4 is a cross-sectional view of a portion of the separator assembly of FIG. 3.
Figure 5:
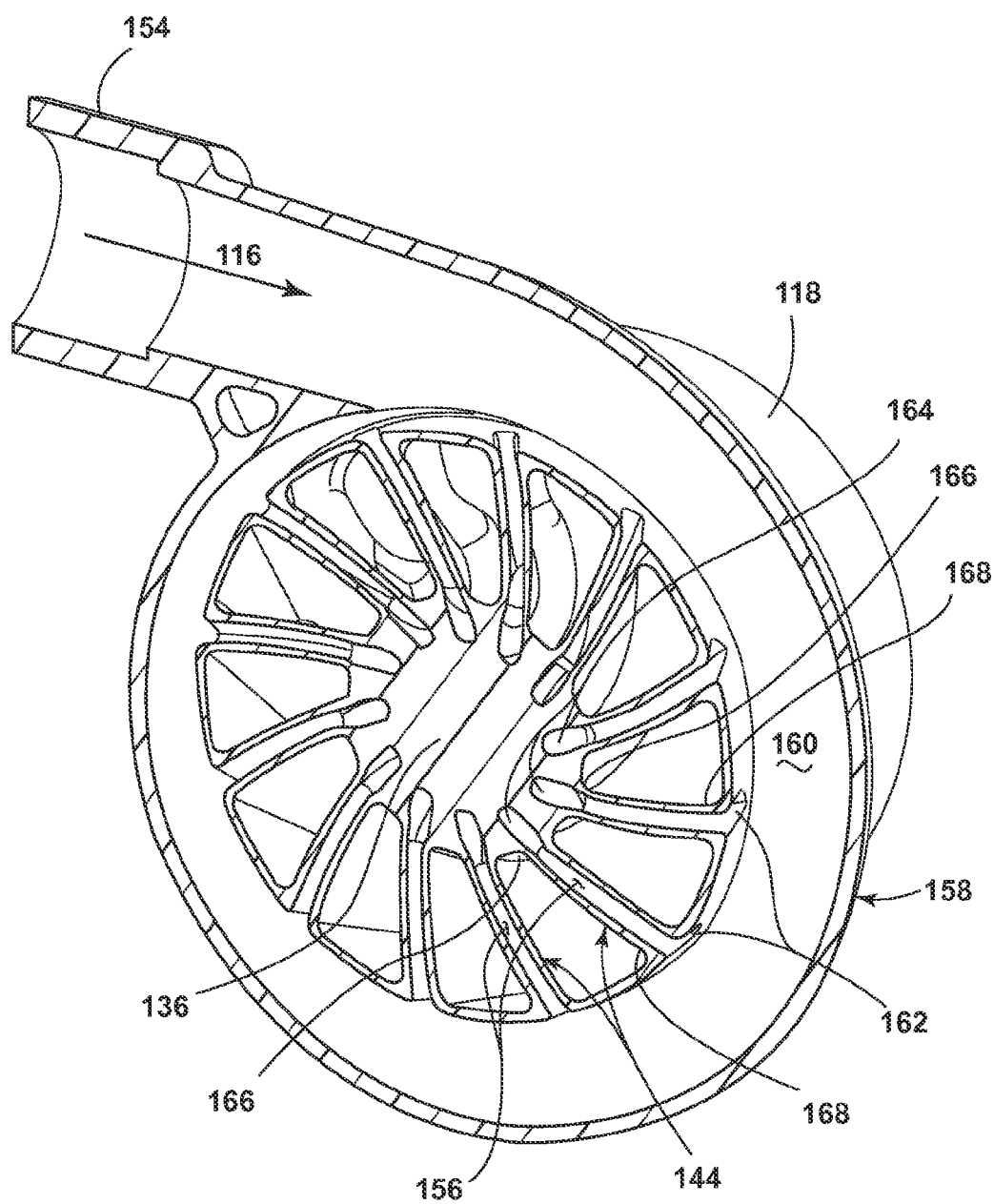
FIG. 5 is a cross-sectional view taken through line V-V of FIG. 4.

FIGS. 4-5 show details of one embodiment of the plenum 158 of FIG. 3. The plenum 158 includes a reintroduction volute 160 that the second reduced-particle stream 116 to the inertial separator 106 through the swirl vanes 144. In the illustrated embodiment, return passages 156 are defined by each of the swirl vanes 144. The return passages 156 include a passage inlet 162 and a passage outlet 164. The passage outlets 164 may be in fluid communication with the development region 146 (FIG. 3), such that the second reduced-particle stream 116 is returned downstream of the swirl vanes 144.

The swirl vanes 144 each comprise a root 166 and a tip 168, with the passage outlet 164 provided at, or approximately at, the root 166 and the passage inlet 162 provided at, or approximately at, the tip 168. Specifically, roots 166 extend radially outwardly form a hub bleed annulus 170 surrounding the centerbody 136. The hub bleed annulus 170 includes a series of internal vanes 172 which define the outlets 164. The hub bleed annulus 170 receives the second reduced-particle stream 116 from the hollow swirl vanes 144 and injects the second reduced-particle stream 116 into the development region 146 downstream of the swirl vanes 144.

Figure 6:
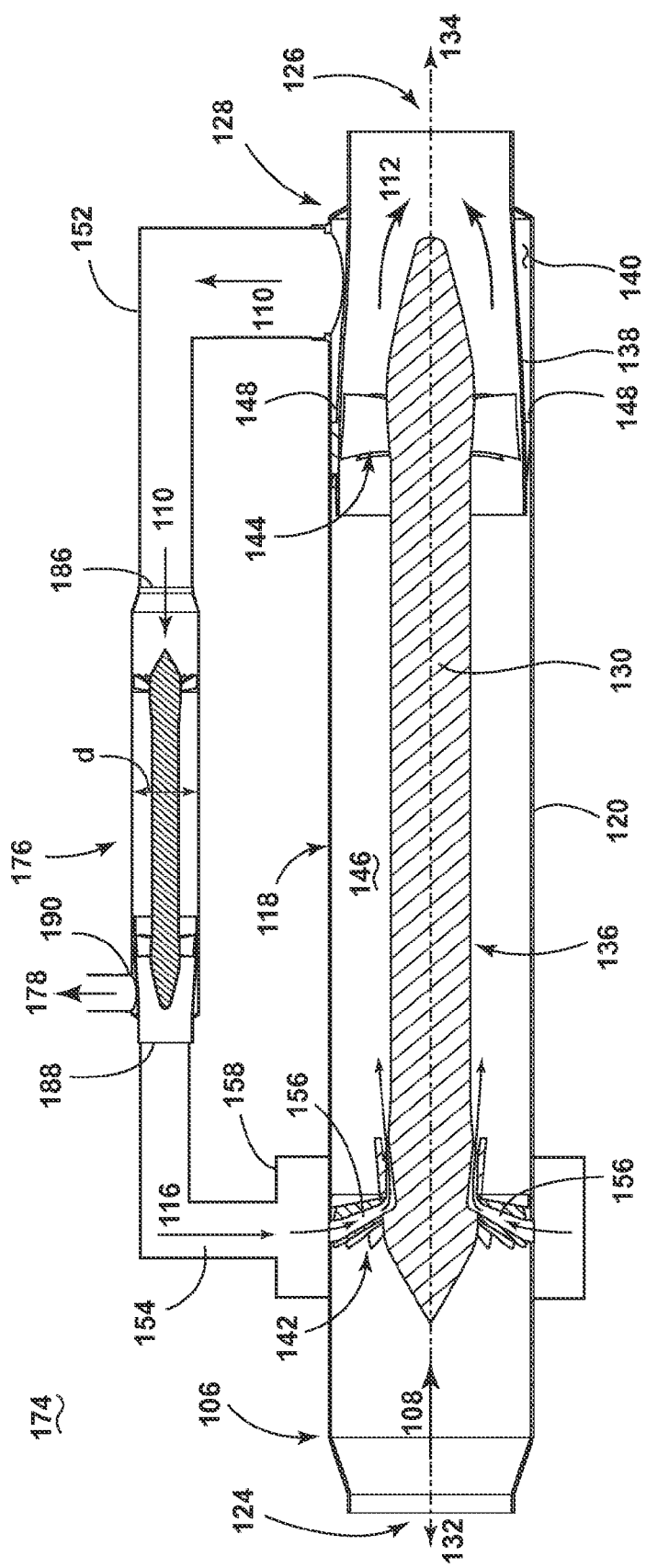
FIG. 6 is a schematic sectional view of a separator assembly according to a second embodiment of the invention.

FIG. 6 is a schematic sectional view of a separator assembly 174 according to a second embodiment of the invention. The second embodiment of the invention is substantially similar to the first embodiment, and like elements are identified with the same reference numerals. The second embodiment differs from the first embodiment in that the separator assembly 174 includes a particle remover in the form of a second particle separator 176 for further separating at least some of the particles from the particle-laden stream 110 and emitting the second reduced-particle stream 116 that is returned to the inertial separator 106. The second particle separator 176 can be provided as another inertial separator, and separates particles from the incoming particle-laden stream 110 into the second reduced-particle stream 116 which contains fewer or a lower concentration of particles than the particle-laden stream 110 and a second particle-laden stream 178 which contains at least some of the particles from the particle-laden stream 110. As noted above with respect to FIG. 2, the second particle-laden stream 178 may be exhausted from the engine 10 or may be utilized in other portion of the engine 10. For example, the second particle-laden stream 178 may be used for cooling the HP turbine after passing through an additional particle remover, driving the LP turbine 36, dumped from the engine 10 under the fan casing 40, or supplied to a combustor bleed 102 after passing through an additional particle remover.

Figure 7:
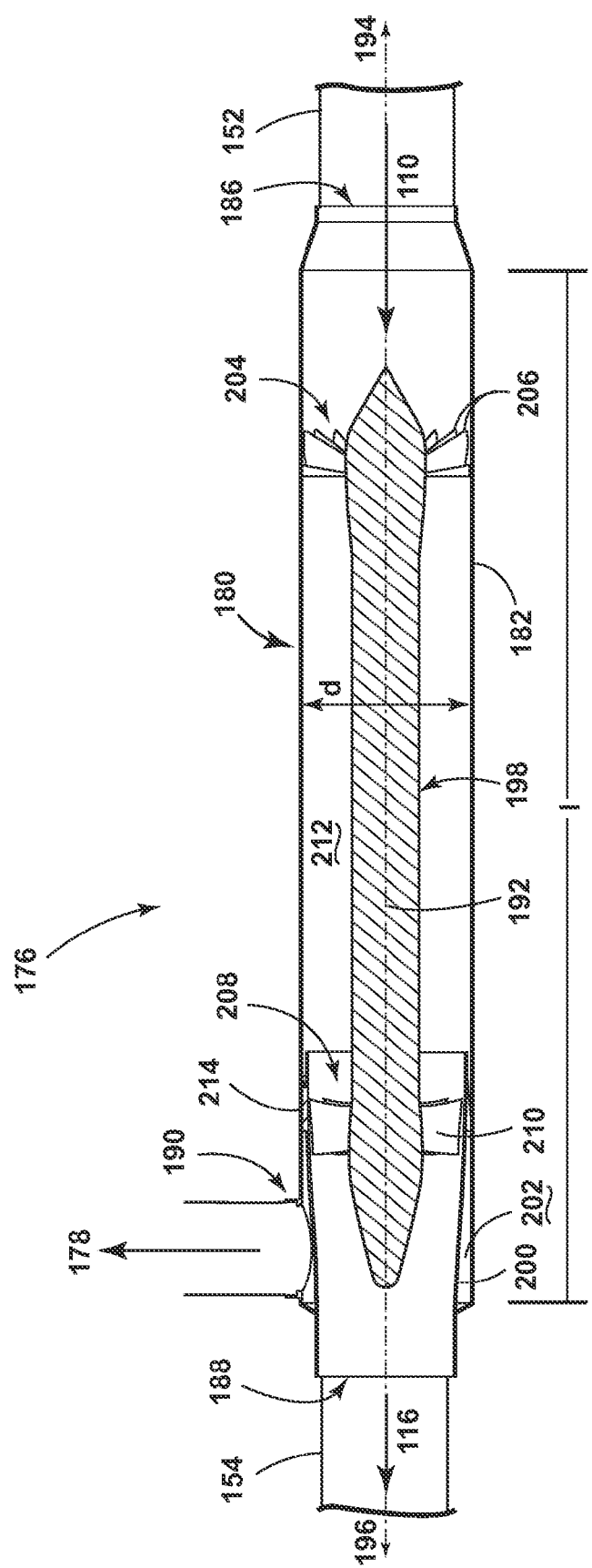
FIG. 7 is a schematic sectional view of a particle remover for the separator assembly of FIG. 6.

FIG. 7 is a schematic sectional view of the second particle separator 176 of FIG. 6. The second particle separator 176 includes a body 180 having a peripheral wall 182 defining a flow passage, with a separator inlet 186 which receives the particle-laden stream 110, a return outlet 188 through which the second reduced-particle stream 116 is passed, and a scavenge outlet 190 through which the second particle-laden stream 178 is passed.

The body 180 defines a centerline 192 of the second particle separator 176, with the centerline 192 generally defining an upstream direction 194 and downstream direction 196 with respect to the second particle separator 176. The second particle separator 176 shown in FIG. 7 is an axial-flow centrifugal separator, with the separator inlet 186 and return outlet 188 co-axially aligned and lying along the centerline 192. In other configurations, the centerline 192 can follow a curve or bend such that the separator inlet 186 and return outlet 188 are not co-axially aligned.

In this embodiment, the peripheral wall 182 is provided as an outer, annular wall. A centerbody 198 can be spaced from the peripheral wall 182, and can extend co-axially along the centerline 192. The centerbody 198 may be straight, as shown, curved, or bent. The centerbody 198 can be designed to provide an aerodynamic profile for the flowing air to pass smoothly around the centerbody 198 without separating from the surface of the centerbody 198.

A scavenge annulus 200 is spaced radially inwardly from the peripheral wall 182, which defines, at least in part, the scavenge outlet 190. The scavenge outlet 190 can be formed as an annular passage 202 between the outer surface of the scavenge annulus 200 and the inner surface of the peripheral wall 182.

The body 180 of the second particle separator 176 may have a smaller diameter d than the diameter D of the body 118 of the first inertial separator 106. In one example, the diameter of the body 180 can be in the range of 0.1D-1.0D. Further, the length l of the body 180 can be in the rage of 0.5D-5D.

A swirler 204 can be located within the body 180 to impart a tangential velocity to the particle-laden stream 110, thereby providing the particle-laden stream 110 with a swirling motion downstream of the swirler 204. The swirler 204 of the illustrated embodiment comprises a plurality of swirl vanes 206 fixed to the centerbody 198. The swirl vanes 206 can be provided as a circumferential array of airfoils extending radially from the centerbody 198 toward the peripheral wall 182. The number of airfoils may vary; in one example, 6-20 airfoils may be provided. Other swirlers 204 for the second particle separator 176 include a screw vane disposed on the inner periphery of the body 180 and/or the outer periphery of the centerbody 198, or a tangentially-oriented inlet 186 providing tangential flow injection.

A deswirler 208 can also be located within the body 180, downstream of the swirler 204, to remove the tangential velocity from the second reduced-particle stream 116 and turn the flow vector of the second reduced-particle stream 116 from predominantly swirling to predominantly axial before it exits the second particle separator 176 and recover the total pressure. The deswirler 208 of the illustrated embodiment comprises a plurality of deswirl vanes 210 provided within the scavenge annulus 200. The deswirl vanes 210 of the illustrated embodiment are provided as a circumferential array of airfoils extending radially from the centerbody 198 toward the scavenge annulus 200. The number of airfoils may vary; in one example, 6-20 airfoils may be provided.

A development region 212 is defined between centerbody 198 and the peripheral wall 182, and between the swirl and deswirl vanes 206, 210. In the development region 212, the particle-laden stream 110 is separated into the second particle-laden stream 178 and the second reduced-particle stream 116 by the migration of particles radially outwardly due to the centrifugal force applied by the swirling air. As a result, particles accumulate toward the outer radius of the development region 212, creating the second particle-laden stream 178 near the outer radius and the second reduced-particle stream 116 near the inner radius. Since the second particle-laden stream 178 is radially outward of the second reduced-particle stream 116, the second particle-laden stream 178 passes from the development region 212 to the scavenge outlet 190 via the annular passage 202 at the exterior of the scavenge annulus 200, while the second reduced-particle stream 116 passes from the development region 212 to the return outlet 188 through the interior of the scavenge annulus 200.

Within the scavenge annulus 200, additional deswirl vanes 214 can be provided in order to remove the tangential velocity from the second particle-laden stream 178 and turn the flow vector of the second particle-laden stream 178 from predominantly swirling to predominantly axial. The deswirl vanes 214 of the illustrated embodiment are provided as a circumferential array of airfoils extending radially from the scavenge annulus 200 toward the peripheral wall 182. The number of airfoils may vary; in one example, 6-20 airfoils may be provided.

While not shown, the scavenge outlet 190 can further include a volute at the end of the scavenge annulus 200 to turn the second particle-laden stream 178 from substantially axial in flow direction to substantially normal to the centerline 192 of the second particle separator 176 so that the second particle-laden stream 178 can be extracted from the second particle separator 176.

Figure 8:
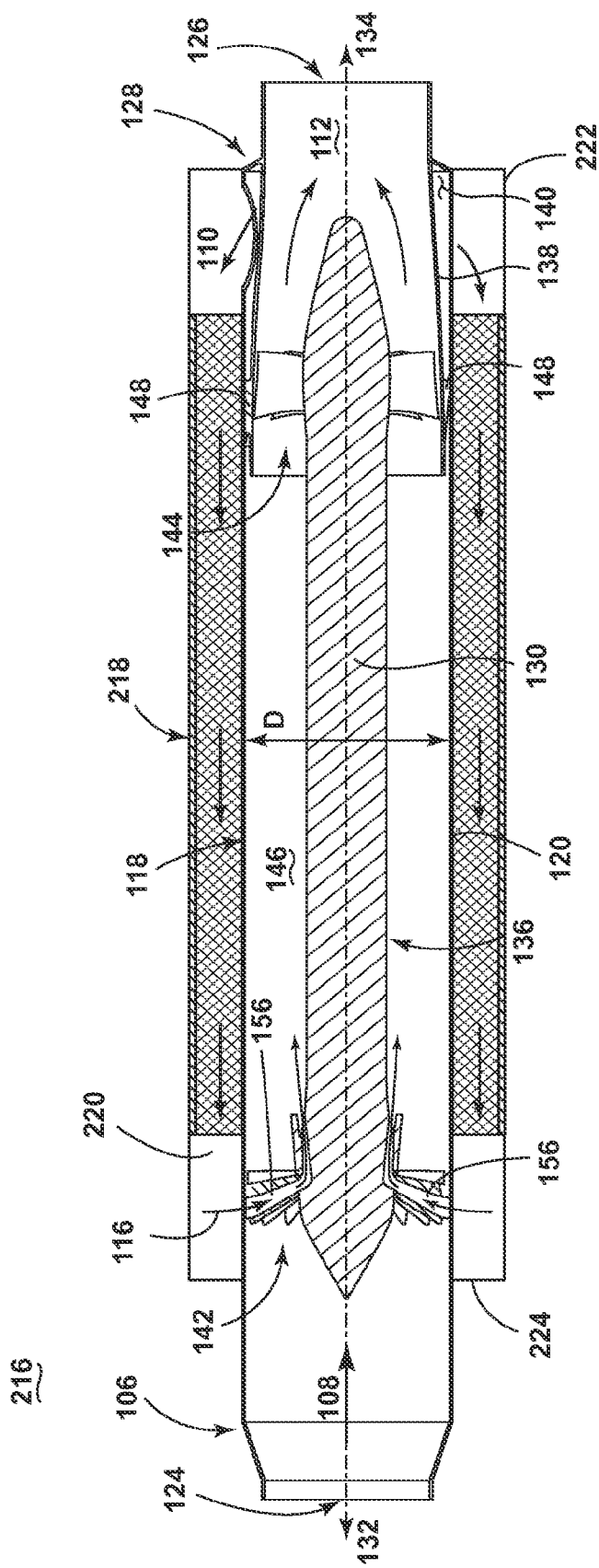
FIG. 8 is a schematic sectional view of a separator assembly according to a third embodiment of the invention.

FIG. 8 is a schematic sectional view of a separator assembly 216 according to a third embodiment of the invention. The third embodiment of the invention is substantially similar to the first embodiment and like elements are identified with the same reference numerals. The third embodiment differs from the first embodiment in that the particle remover is provided as an annular filter 218 disposed about the peripheral wall 120 of the inertial separator 106. The annular filter 218 includes a return outlet 220 that emits the second reduced-particle stream 116. The return outlet 220 is fluidly coupled with the inertial separator 106 to return the second reduced-particle stream to the inertial separator 106. The filter 218 can be coupled with the scavenge outlet 128 via a plenum 222 located axially of the scavenge annulus 138. The return outlet 220 of the filter 218 can be coupled with a second plenum 224 located axially of the swirl vanes 142 and in fluid communication with the return outlet 220 and the return passages 156.

Figure 9:
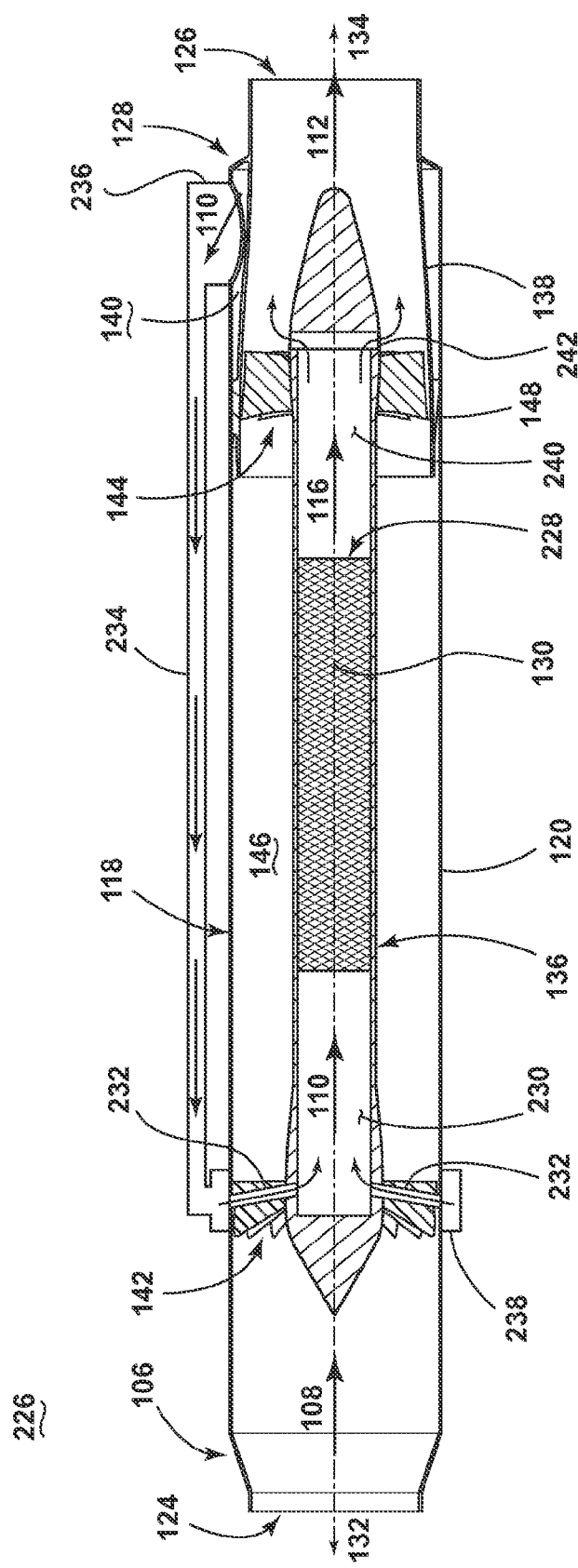
FIG. 9 is a schematic sectional view of a separator assembly according to a fourth embodiment of the invention.

FIG. 9 is a schematic sectional view of a separator assembly 226 according to a fourth embodiment of the invention. The fourth embodiment of the invention is substantially similar to the first embodiment and like elements are identified with the same reference numerals. The fourth embodiment differs from the first embodiment in that the particle remover is provided as an internal filter 228 disposed within the centerbody 136 of the inertial separator 106.

The internal filter 228 includes an inlet 230 that receives the particle-laden stream 110. At least one of the swirl vanes 142 defines an inlet passage 232 fluidly coupled with the scavenge outlet 128 which provides the particle-laden stream 110 to the inlet 230. In the illustrated embodiment, multiple swirl vanes 142 are provided with inlet passages 232. The inlet passages 232 may have substantially the same structure as the return passages 156 shown in FIGS. 4-5.

The inlet passages 232 can be coupled with the scavenge outlet 128 via a conduit 234 having an upstream plenum 236 located axially of the scavenge annulus 138 and a downstream plenum 238 located axially of the swirl vanes 142 and in fluid communication with the inlet passages 232.

The internal filter 228 further includes a return outlet 240 that emits the second reduced-particle stream 116. The return outlet 240 is fluidly coupled with the inertial separator 106 to return the second reduced-particle stream 116 to the inertial separator 106. In the illustrated embodiment, the return outlet 240 is in fluid communication with a return passage 242 extending annularly through the centerbody 136 to merge the second reduced-particle stream 116 with the first reduced-particle stream 112 downstream of the deswirl vanes 144.

Figure 10:
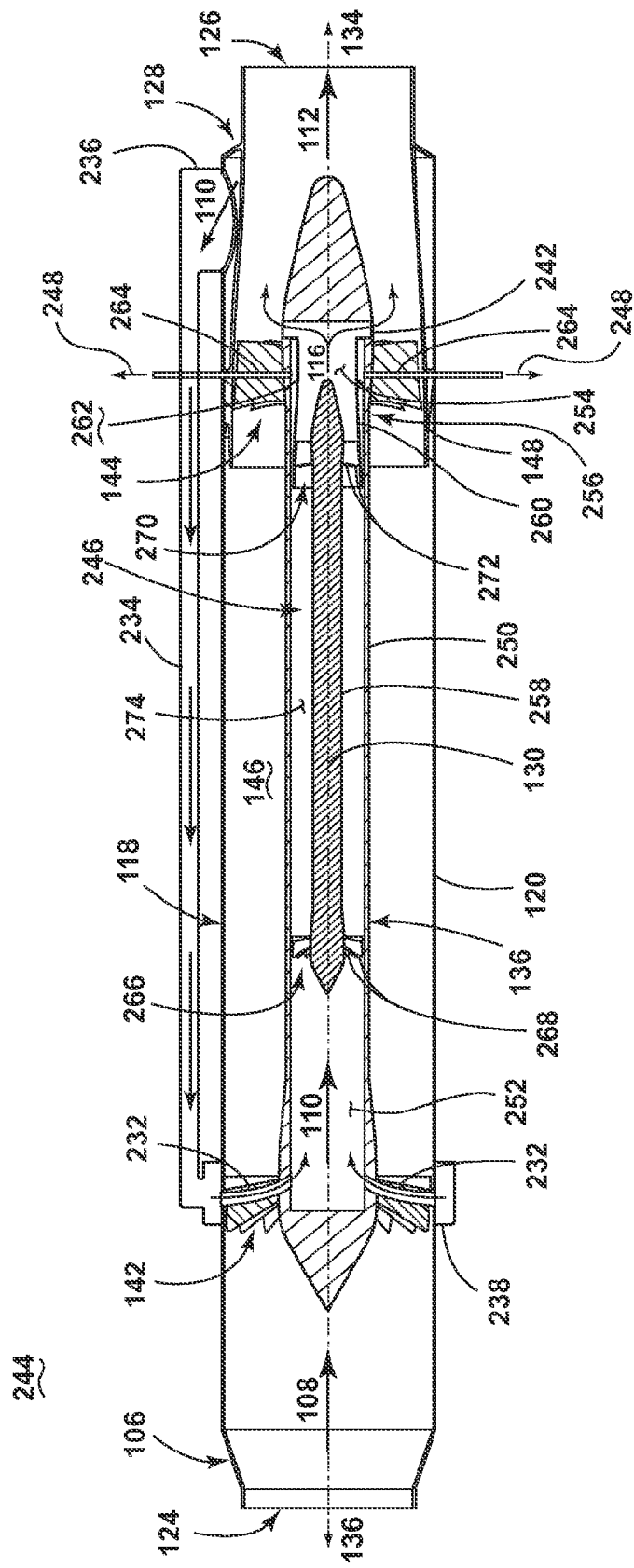
FIG. 10 is a schematic sectional view of a separator assembly according to a fifth embodiment of the invention.

FIG. 10 is a schematic sectional view of a separator assembly 244 according to a fifth embodiment of the invention. The fifth embodiment of the invention is substantially similar to the fourth embodiment shown in FIG. 9, and like elements are identified with the same reference numerals. The fifth embodiment differs from the fourth embodiment in that the separator assembly 244 includes a particle remover in the form of a second particle separator 246 for further separating at least some of the particles from the particle-laden stream 110 and emitting the second reduced-particle stream 116 that is returned to the inertial separator 106. The second particle separator 246 can be provided as another inertial separator, and separates particles from the incoming particle-laden stream 110 into the second reduced-particle stream 116 which contains fewer or a lower concentration of particles than the particle-laden stream 110 and a second particle-laden stream 248 which contains at least some of the particles from the particle-laden stream 110. As noted above with respect to FIG. 2, the second particle-laden stream 248 may be exhausted from the engine 10 or may be utilized in other portion of the engine 10. For example, the second particle-laden stream 248 may be used for cooling the HP turbine after passing through an additional particle remover, driving the LP turbine 36, dumped from the engine 10 under the fan casing 40, or supplied to a combustor bleed 102 after passing through an additional particle remover.

In this embodiment, the centerbody 136 of the first inertial separator 106 is at least partially hollow and has a peripheral wall 250 defining a flow passage through the second particle separator 246. The second particle separator 246 further includes a separator inlet 252 which receives the particle-laden stream 110, a return outlet 254 through which the second reduced-particle stream 116 is passed, and a scavenge outlet 256 through which the second particle-laden stream 248 is passed. A second centerbody 258 can be spaced from the peripheral wall 250 of the first centerbody 136, and can extend co-axially along the centerline 130. The second particle separator 246 shown in FIG. 9 is an axial-flow centrifugal separator, with the separator inlet 252 and return outlet 254 generally co-axially aligned and lying along the centerline 130.

A scavenge annulus 260 is spaced radially inwardly from the peripheral wall 250, and defines, at least in part, the scavenge outlet 256. The scavenge outlet 256 can include an annular passage 262 between the outer surface of the scavenge annulus 260 and the inner surface of the peripheral wall 250. While not shown, the scavenge outlet 256 can further include a volute at the end of the scavenge annulus 260 to turn the second particle-laden stream 248 from substantially axial in flow direction to substantially normal to the centerline 130 so that the second particle-laden stream 248 can be extracted from the second particle separator 246.

At least one of the deswirl vanes 144 defines a scavenge passage 264 fluidly coupled with the scavenge outlet 256, which passes the second particle-laden stream 248 out of the separator assembly 244. In the illustrated embodiment, multiple deswirl vanes 144 are provided with scavenge passages 264. The scavenge passages 264 can pass the second particle-laden stream 248 to another portion of the engine 10 or may exhaust the second particle-laden stream 248 from the engine 10, as described above with reference to FIG. 2.

A swirler 266 can be located within the centerbody 136 to impart a tangential velocity to the particle-laden stream 110, thereby providing the particle-laden stream 110 with a swirling motion downstream of the swirler 266. The swirler 266 of the illustrated embodiment comprises a plurality of swirl vanes 268 fixed to the centerbody 258. The swirl vanes 268 can be provided as a circumferential array of airfoils extending radially from the centerbody 258 toward the peripheral wall 250. The number of airfoils may vary; in one example, 6-20 airfoils may be provided. Other swirlers 266 for the second particle separator 246 include a screw vane disposed on the inner periphery of the centerbody 136 and/or the outer periphery of the inner centerbody 258, or a tangentially-oriented inlet 252 providing tangential flow injection.

A deswirler 270 can also be located within the centerbody 136, downstream of the swirler 266, to remove the tangential velocity from the second reduced-particle stream 116 and turn the flow vector of the second reduced-particle stream 116 from predominantly swirling to predominantly axial before it exits the second particle separator 246 and recover the total pressure. The deswirler 270 of the illustrated embodiment comprises a plurality of deswirl vanes 272 provided within the scavenge annulus 260. The deswirl vanes 272 of the illustrated embodiment are provided as a circumferential array of airfoils extending radially from the centerbody 258 toward the scavenge annulus 260. The number of airfoils may vary; in one example, 6-20 airfoils may be provided.

A development region 274 is defined between centerbody 258 and the peripheral wall 250, and between the swirl and deswirl vanes 268, 272. In the development region 274, the particle-laden stream 110 is separated into the second particle-laden stream 248 and the second reduced-particle stream 116 by the migration of particles radially outwardly due to the centrifugal force applied by the swirling air. As a result, particles accumulate toward the outer radius of the development region 274, creating the second particle-laden stream 248 near the outer radius and the second reduced-particle stream 116 near the inner radius. Since the second particle-laden stream 248 is radially outward of the second reduced-particle stream 116, the second particle-laden stream 248 passes from the development region 274 to the scavenge passages 264 via the annular passage 262 at the exterior of the scavenge annulus 260, while the second reduced-particle stream 116 passes from the development region 274 to the return outlet 254 through the interior of the scavenge annulus 260. Within the scavenge annulus 260, additional deswirl vanes (not shown) can be provided in order to remove the tangential velocity from the second particle-laden stream 248 and turn the flow vector of the second particle-laden stream 248 from predominantly swirling to predominantly axial.

Figure 11:
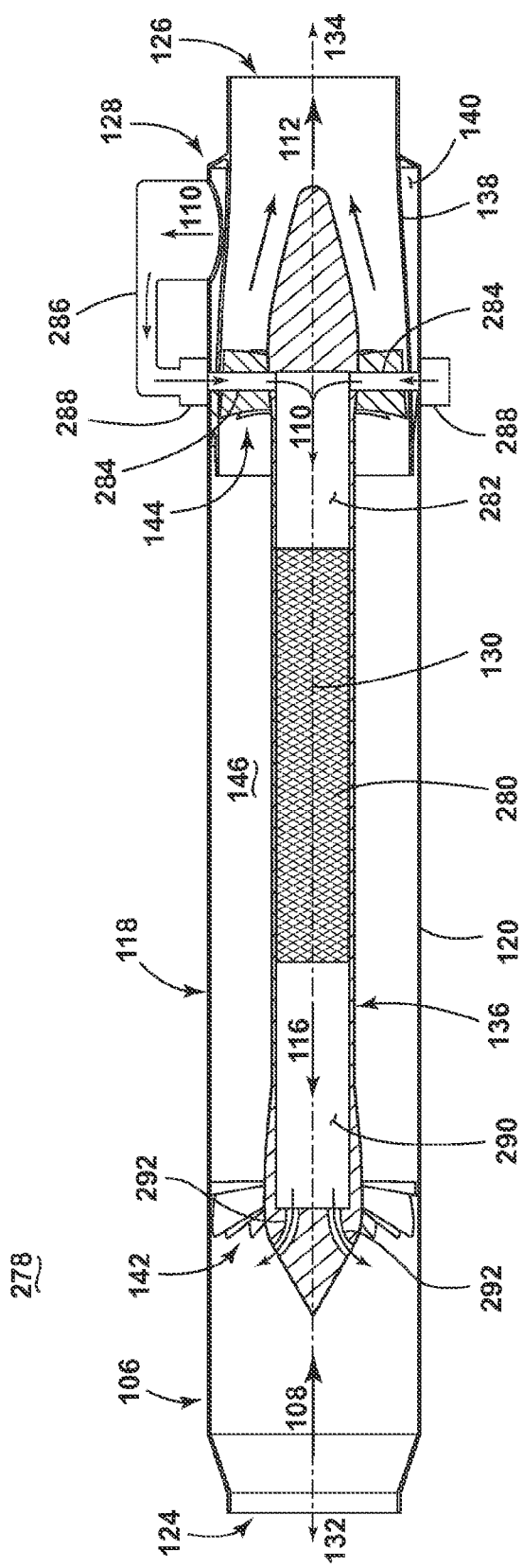
FIG. 11 is a schematic sectional view of a separator assembly according to a sixth embodiment of the invention.

FIG. 11 is a schematic sectional view of a separator 278 assembly according to a sixth embodiment of the invention. The sixth embodiment of the invention is substantially similar to the first embodiment and like elements are identified with the same reference numerals. The sixth embodiment differs from the first embodiment in that the particle remover is provided as an internal filter 280 disposed within the centerbody 136 of the inertial separator 106, and further in that the second reduced-particle stream 116 from the filter 280 is returned to the inertial separator 106 through the centerbody 136, rather than being returned through the swirl vanes 142.

The internal filter 280 includes an inlet 282 that receives the particle-laden stream 110. At least one of the deswirl vanes 144 defines an inlet passage 284 fluidly coupled with the scavenge outlet 128 which provides the particle-laden stream 110 to the inlet 282. In the illustrated embodiment, multiple swirl vanes 144 are provided with inlet passages 284.

The inlet passages 284 can be coupled with the scavenge outlet 128 via a conduit 286 extending axially from the scavenge annulus 138. The conduit 286 can include a plenum 288 located axially of the deswirl vanes 144 and in fluid communication with the inlet passages 284. The plenum 288 can include a volute to turn the particle-laden stream 110 from substantially axial in flow direction to substantially normal to the centerline 130.

The internal filter 280 further includes a return outlet 290 that emits the second reduced-particle stream 116. The return outlet 290 is fluidly coupled with the inertial separator 106 to return the second reduced-particle stream 116 to the inertial separator 106. In the illustrated embodiment, the return outlet 290 is in fluid communication with a return passage 292 extending annularly through the centerbody 136 to merge the second reduced-particle stream 116 with the cooling fluid stream 108 upstream of the swirl vanes 142.

Figure 12:
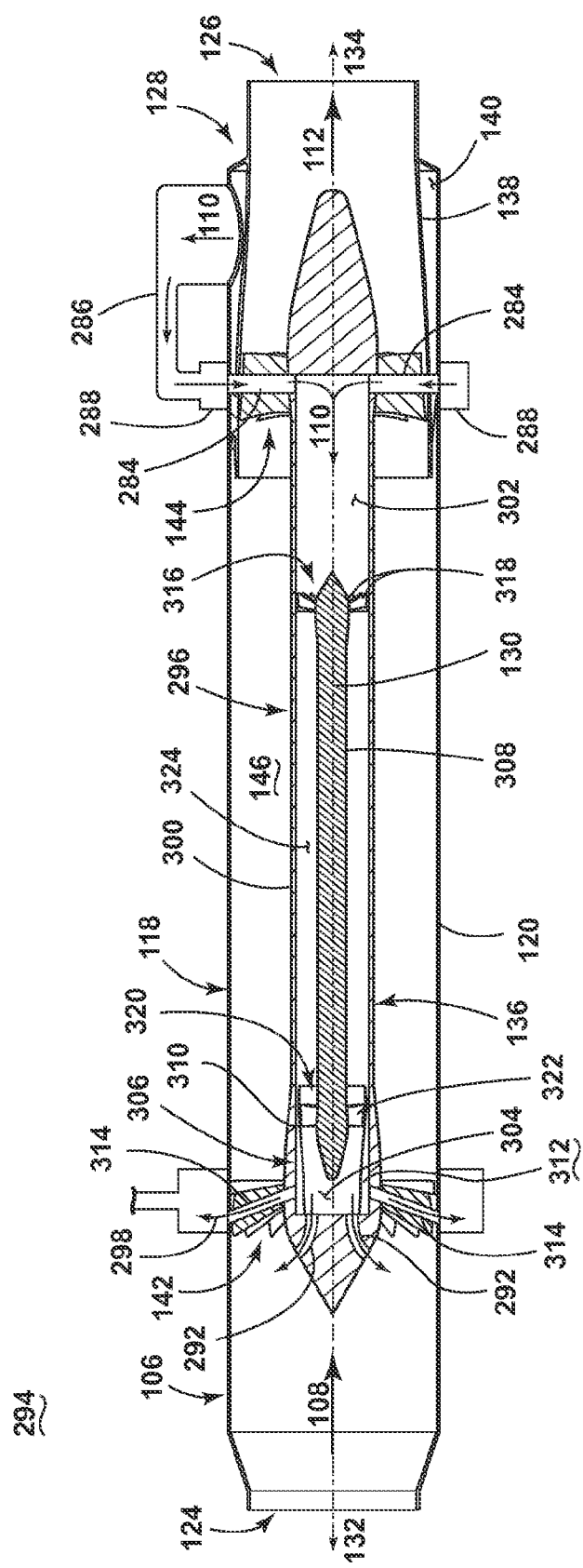
FIG. 12 is a schematic sectional view of a separator assembly according to a seventh embodiment of the invention.

FIG. 12 is a schematic sectional view of a separator assembly 294 according to a seventh embodiment of the invention. The seventh embodiment of the invention is substantially similar to the sixth embodiment shown in FIG. 11, and like elements are identified with the same reference numerals. The seventh embodiment differs from the sixth embodiment in that the separator assembly 294 includes a particle remover in the form of a second particle separator 296 for further separating at least some of the particles from the particle-laden stream 110 and emitting the second reduced-particle stream 116 that is returned to the inertial separator 106. The second particle separator 296 can be provided as another inertial separator, and separates particles from the incoming particle-laden stream 110 into the second reduced-particle stream 116 which contains fewer or a lower concentration of particles than the particle-laden stream 110 and a second particle-laden stream 298 which contains at least some of the particles from the particle-laden stream 110. As noted above with respect to FIG. 2, the second particle-laden stream 298 may be exhausted from the engine 10 or may be utilized in other portion of the engine 10. For example, the second particle-laden stream 298 may be used for cooling the HP turbine after passing through an additional particle remover, driving the LP turbine 36, dumped from the engine 10 under the fan casing 40, or supplied to a combustor bleed 102 after passing through an additional particle remover.

In this embodiment, the centerbody 136 of the first inertial separator 106 is at least partially hollow and has a peripheral wall 300 defining a flow passage through the second particle separator 296. The second particle separator 296 further includes a separator inlet 302 which receives the particle-laden stream 110, a return outlet 304 through which the second reduced-particle stream 116 is passed, and a scavenge outlet 306 through which the second particle-laden stream 298 is passed. A second centerbody 308 can be spaced from the peripheral wall 300 of the first centerbody 136, and can extend co-axially along the centerline 130. The second particle separator 396 shown in FIG. 9 is an axial-flow centrifugal separator, with the separator inlet 302 and return outlet 304 generally co-axially aligned and lying along the centerline 130.

In the illustrated embodiment, the inlet 302 is in fluid communication with the inlet passages 284 of the deswirl vanes 144 to receive the particle-laden stream 110 from the first inertial separator 106. The return outlet 304 is in fluid communication with the return passage 292 of the centerbody 136 to merge the second reduced-particle stream 116 with the cooling fluid stream 108 upstream of the swirl vanes 142.

A scavenge annulus 310 is spaced radially inwardly from the peripheral wall 300, and defines, at least in part, the scavenge outlet 306. The scavenge outlet 306 can include an annular passage 312 between the outer surface of the scavenge annulus 310 and the inner surface of the peripheral wall 300.

At least one of the swirl vanes 142 defines a scavenge passage 314 fluidly coupled with the scavenge outlet 306, which passes the second particle-laden stream 298 out of the separator assembly 294. In the illustrated embodiment, multiple swirl vanes 142 are provided with scavenge passages 314. The scavenge passages 314 can pass the second particle-laden stream 298 to another portion of the engine 10 or may exhaust the second particle-laden stream 248 from the engine 10, as described above with reference to FIG. 2.

A swirler 316 can be located within the centerbody 136 to impart a tangential velocity to the particle-laden stream 110, thereby providing the particle-laden stream 110 with a swirling motion downstream of the swirler 316. The swirler 316 of the illustrated embodiment comprises a plurality of swirl vanes 318 fixed to the centerbody 308. The swirl vanes 318 can be provided as a circumferential array of airfoils extending radially from the centerbody 308 toward the peripheral wall 300. The number of airfoils may vary; in one example, 6-20 airfoils may be provided. Other swirlers 316 for the second particle separator 296 include a screw vane disposed on the inner periphery of the centerbody 136 and/or the outer periphery of the inner centerbody 308, or a tangentially-oriented inlet 302 providing tangential flow injection.

A deswirler 320 can also be located within the centerbody 136, downstream of the swirler 316, to remove the tangential velocity from the second reduced-particle stream 116 and turn the flow vector of the second reduced-particle stream 116 from predominantly swirling to predominantly axial before it exits the second particle separator 296 and recover the total pressure. The deswirler 320 of the illustrated embodiment comprises a plurality of deswirl vanes 322 provided within the scavenge annulus 310. The deswirl vanes 322 of the illustrated embodiment are provided as a circumferential array of airfoils extending radially from the centerbody 308 toward the scavenge annulus 310. The number of airfoils may vary; in one example, 6-20 airfoils may be provided.

A development region 324 is defined between centerbody 308 and the peripheral wall 300, and between the swirl and deswirl vanes 318, 322. In the development region 324, the particle-laden stream 110 is separated into the second particle-laden stream 298 and the second reduced-particle stream 116 by the migration of particles radially outwardly due to the centrifugal force applied by the swirling air. As a result, particles accumulate toward the outer radius of the development region 324, creating the second particle-laden stream 298 near the outer radius and the second reduced-particle stream 116 near the inner radius. Since the second particle-laden stream 298 is radially outward of the second reduced-particle stream 116, the second particle-laden stream 298 passes from the development region 324 to the scavenge passages 314 via the annular passage 312 at the exterior of the scavenge annulus 310, while the second reduced-particle stream 116 passes from the development region 324 to the return outlet 304 through the interior of the scavenge annulus 310. Within the scavenge annulus 310, additional deswirl vanes (not shown) can be provided in order to remove the tangential velocity from the second particle-laden stream 298 and turn the flow vector of the second particle-laden stream 298 from predominantly swirling to predominantly axial.

In the embodiments disclosed herein having a filter as the particle remover, the filter can be sized to minimize pressure drop across the separator assembly and have a particle capacity to complete a life-cycle of specified duration. An exemplary filter media can have a diameter of 0.1 inch-6 inch and a length of 1 inch-10 inch. The filter can further be capable of operating at a maximum temperature of 1400° F. and at a maximum pressure of 900 psia. The filter can be an accessible unit that can be periodically serviced, such as by cleaning or replacing the filter during an engine overhaul. In one example, the filter can include a housing that is designed to facilitate removal of a filter media for cleaning and/or replacement.

Further, in the embodiments disclosed herein having a filter as the particle remover, the filter can include a filter media configured to remove a predetermined particle size from the particle-laden stream. In one example, the filter can capture particles greater than 0.01 microns in size. Some non-limiting examples of a suitable filter media include porous ceramic, porous metal, metal foam, metal fiber, ceramic fiber, metal honeycomb, or ceramic honeycomb.

The various embodiments of systems, methods, and other devices related to the invention disclosed herein provide improved particle separation, particularly in a turbine engine. One advantage that may be realized in the practice of some embodiments of the described systems is that the various embodiments of systems, methods, and other devices disclosed herein may be used, alone or in combination, to remove particles from a cooling air flow in a turbine engine. The reduction of particles in the cooling air can improve cooling and engine component durability. The service life of aircraft engines is often limited by particle accumulation in turbine cooling passages, and so removal or significant reduction in particle accumulation will increase the operational lifespan of engines between servicing.

Another advantage that may be realized in the practice of some embodiments of the described systems and methods is that fine sand particulate from secondary flow circuits can be removed using a closed-loop inertial separator system. The closed-loop inertial separator is designed to remove dust particles from a core stream at minimum total pressure loss across the device and with no loss of flow.

Yet another advantage that may be realized in the practice of some embodiments of the described systems and methods is that the closed-loop design eliminates the need for ejecting air overboard. Prior inertial separators separate particulate matter from the particle-laden stream and eject the particle-laden stream to a bleed or overboard not to be reused in the engine; this has a negative impact on specific fuel consumption and is not desirable. By using a filter, or secondary separator, and returning all, or greater than 98%, of the air to the primary separator, the loss of air overboard is negated, or significantly reduced, resulting in no impact to, or only a minor reduction in, specific fuel consumption.

Various elements of the systems and devices described herein may be made by any suitable manufacturing method, including but not limited to methods currently known as "additive manufacturing" where components are made by building them up from particles or liquids fused together progressively to arrive at the desired size, shape, and configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A separator assembly for removing entrained particles from a fluid stream passing through a gas turbine engine, comprising:
    a first particle separator for separating the fluid stream into a reduced-particle stream and a particle-laden stream, comprising:
        an inlet receiving the fluid stream;
        a reduced-particle outlet emitting the reduced-particle stream; and
        a scavenge outlet emitting the particle-laden stream; and
    a particle remover fluidly coupled to the scavenge outlet to receive all of the particle-laden stream and form a closed loop separator system and comprising a return outlet emitting a second reduced-particle stream from the particle-laden stream;
    wherein the return outlet is fluidly coupled to the first particle separator to return the second reduced-particle stream to the first particle separator; wherein the first particle separator comprises a plurality of swirl vanes located within the fluid stream and imparting a tangential velocity to the fluid stream, thereby providing the fluid stream with a swirling motion downstream of the swirl vane; and wherein the particle remover comprises a filter.

2. The separator assembly of claim 1 wherein the filter is configured to capture particles greater than 0.01 microns in size.

3. The separator assembly of claim 1 wherein the filter comprises a filter media of porous ceramic, porous metal, metal foam, metal fiber, ceramic fiber, metal honeycomb, or ceramic honeycomb.

4. The separator assembly of claim 1 wherein the particle remover comprises a second particle separator separating the particle-laden stream into the second reduced-particle stream and a second particle-laden stream.

5. The separator assembly of claim 4 wherein the second particle separator comprises a swirler imparting a tangential velocity to the particle-laden stream.

6. The separator assembly of claim 5 wherein the second particle separator further comprises a deswirler configured to remove the tangential velocity from the second reduced-particle stream.

7. The separator assembly of claim 5 wherein the second particle separator comprises a scavenge outlet configured to receive the second particle-laden stream.

8. The separator assembly of claim 1 wherein at least one of the swirl vanes comprises a return passage fluidly coupled with the return outlet and having a passage outlet fluidly coupled to the fluid stream, and wherein the second reduced-particle stream is returned to the fluid stream through the return passage.

9. The separator assembly of claim 8 wherein the at least one of the swirl vanes comprises a root and a tip, with the passage outlet provided at the root and a passage inlet of the return passage provided at the tip.

10. The separator assembly of claim 8 wherein more than one of the plurality of swirl vanes defines a return passage, and the return outlet of the particle remover is fluidly coupled to each return passage.

11. The separator assembly of claim 8 wherein the first particle separator comprises a plurality of deswirl vanes located downstream of the plurality of swirl vanes and removing the tangential velocity from the fluid stream.

12. The separator assembly of claim 11 wherein the first particle separator comprises a body having a peripheral wall defining a flow passage through which the fluid stream flows.

13. The separator assembly of claim 12 wherein the plurality of swirl vanes and plurality of deswirl vanes are located within the body and define a development region therebetween.

14. The separator assembly of claim 13 wherein the return passage is fluidly coupled with the flow passage downstream of the plurality of swirl vanes to return the second reduced-particle stream to the development region.

15. The separator assembly of claim 13 wherein the first particle separator further comprises a centerbody within the peripheral wall, with the development region defined between the peripheral wall and centerbody.

16. The separator assembly of claim 13 wherein the first particle separator further comprises a scavenge annulus within the peripheral wall and defining an annular passage therebetween in fluid communication with the scavenge outlet.

17. The separator assembly of claim 13 wherein the plurality of deswirl vanes are located within the scavenge annulus.

18. The separator assembly of claim 12 wherein the particle remover is disposed about the peripheral wall.

19. The separator assembly of claim 18 wherein the particle remover comprises a filter.

20. The separator assembly of claim 12 wherein the particle remover is coupled with the particle separator via at least one conduit.

21. The separator assembly of claim 20 wherein the at least one conduit comprises a first conduit extending from the scavenge outlet to the particle remover and a second conduit extending from the return outlet to the return passage.

22. The separator assembly of claim 21 wherein the second conduit comprises a plenum located axially to the plurality of swirl vanes and in fluid communication with the return outlet and the return passage.

23. The separator assembly of claim 22 wherein the plenum comprises a volute.

24. A separator assembly for removing entrained particles from a fluid stream passing through a gas turbine engine, comprising:
a first particle separator for separating the fluid stream into a reduced-particle stream and a particle-laden stream, comprising:
a body having a peripheral wall defining a flow passage through which the fluid stream flows;
a centerbody within the peripheral wall;
an inlet receiving the fluid stream;
a reduced-particle outlet emitting the reduced-particle stream; and
a scavenge outlet emitting the particle-laden stream; and
a particle remover located within the centerbody and fluidly coupled to the scavenge outlet to receive all of the particle-laden stream and form a closed loop separator system, comprising:
a return outlet emitting a second reduced-particle stream from the particle-laden stream;
wherein the return outlet is fluidly coupled to the flow passage to return the second reduced-particle stream to the flow passage; further comprising a first vane extending from the centerbody and defining an inlet passage to the second particle separator, wherein the first vane comprises one of a swirl vane or a deswirl vane and the second vane comprises the other one of a swirl vane or a deswirl vane; wherein the particle remover comprises a second particle separator separating the particle-laden stream into the second reduced-particle stream and a second particle-laden stream; and wherein the particle remover comprises a filter.

25. The separator assembly of claim 24, wherein the centerbody further comprises a return passage coupled with the return outlet.

26. The separator assembly of claim 25, wherein the return passage comprises a passage outlet within the inlet or the reduced-particle outlet of the first particle separator.

27. The separator assembly of claim 24 wherein the filter is configured to capture particles greater than 0.01 microns in size.

28. The separator assembly of claim 24 wherein the filter comprises a filter media of porous ceramic, porous metal, metal foam, metal fiber, ceramic fiber, metal honeycomb, or ceramic honeycomb.

29. The separator assembly of claim 24 wherein the second particle separator comprises a swirler imparting a tangential velocity to the particle-laden stream and a deswirler configured to remove the tangential velocity from the second reduced-particle stream.

30. The separator assembly of claim 29 wherein the swirler comprises a plurality of swirl vanes, a screw vane, or tangential flow injection.

31. The separator assembly of claim 24 and further comprising a second vane extending from the centerbody and defining a scavenge passage emitting the second particle-laden stream from the second particle separator.

32. A separator assembly for removing particles from a fluid stream passing through an engine, comprising:
a first particle separator for separating the fluid stream into a reduced-particle stream and a particle-laden stream, comprising:
an inlet receiving the fluid stream;
a reduced-particle outlet emitting the reduced-particle stream; and
a scavenge outlet emitting the particle-laden stream; and
a particle remover fluidly coupled to the scavenge outlet to receive all of the particle-laden stream and form a closed loop separator system and having a return outlet emitting a second reduced-particle stream;

wherein the return outlet is fluidly coupled to the first particle separator to return the second reduced-particle stream to the first particle separator; wherein the first particle separator comprises a plurality of swirl vanes located within the fluid stream and imparting a tangential velocity to the fluid stream, thereby providing the fluid stream with a swirling motion downstream of the swirl vane; and wherein the particle remover comprises a filter.

33. The separator assembly of claim 32 wherein at least one of the swirl vanes comprises a return passage fluidly coupled with the return outlet and having a passage outlet fluidly coupled to the fluid stream, and wherein the second reduced-particle stream is returned to the fluid stream through the return passage.

34. The separator assembly of claim 33 wherein the at least one of the swirl vanes comprises a root and a tip, with the passage outlet provided at the root and a passage inlet of the return passage provided at the tip.

35. The separator assembly of claim 33 wherein more than one of the plurality of swirl vanes defines a return passage, and the return outlet of the particle remover is fluidly coupled to each return passage.

36. The separator assembly of claim 33 wherein the first particle separator comprises a plurality of deswirl vanes located downstream of the plurality of swirl vanes and removing the tangential velocity from the fluid stream.

37. The separator assembly of claim 36 wherein the first particle separator comprises a body having a peripheral wall defining a flow passage through which the fluid stream flows.

38. The separator assembly of claim 37 wherein the plurality of swirl vanes and plurality of deswirl vanes are located within the body and define a development region therebetween.

39. The separator assembly of claim 38 wherein the return passage is fluidly coupled with the flow passage downstream of the plurality of swirl vanes to return the second reduced-particle stream to the development region.

40. The separator assembly of claim 38 wherein the first particle separator further comprises a centerbody within the peripheral wall, with the development region defined between the peripheral wall and center body.

* * * * *